United States Patent

Körte

[11] Patent Number: 5,853,431
[45] Date of Patent: Dec. 29, 1998

[54] 1:2 CHROMIUM COMPLEXES, THEIR PRODUCTION AND USE

[75] Inventor: Klaus Körte, Ettingen, Switzerland

[73] Assignee: Clariant Finance (BVI) Limited, Tortola, Virgin Islands (Br.)

[21] Appl. No.: 952,035

[22] PCT Filed: Mar. 6, 1997

[86] PCT No.: PCT/IB97/00204

§ 371 Date: Nov. 6, 1997

§ 102(e) Date: Nov. 6, 1997

[87] PCT Pub. No.: WO97/32933

PCT Pub. Date: Sep. 12, 1997

[30] Foreign Application Priority Data

Mar. 7, 1996 [GB] United Kingdom .................. 9604816

[51] Int. Cl.⁶ .......................... C09B 45/16; C25D 11/24
[52] U.S. Cl. .................. 8/522; 8/527; 8/685; 8/686; 534/696; 534/700; 534/713; 534/721; 534/723
[58] Field of Search ................ 8/522, 527, 685, 8/686; 534/696, 700, 713, 721, 723

[56] References Cited

U.S. PATENT DOCUMENTS

| 3,211,512 | 10/1965 | Berger . |
| 4,416,816 | 11/1983 | Grossmann . |
| 5,401,832 | 3/1995 | Koerte ..................... 534/696 |

FOREIGN PATENT DOCUMENTS

| 2 190 808 | 2/1974 | France . |
| 2 285 441 | 4/1976 | France . |
| 1 454 982 | 11/1976 | United Kingdom . |
| 2 268 183 | 1/1994 | United Kingdom . |

*Primary Examiner*—Margaret Einsmann
*Attorney, Agent, or Firm*—Susan S. Jackson

[57] ABSTRACT

Compounds of formula (I)

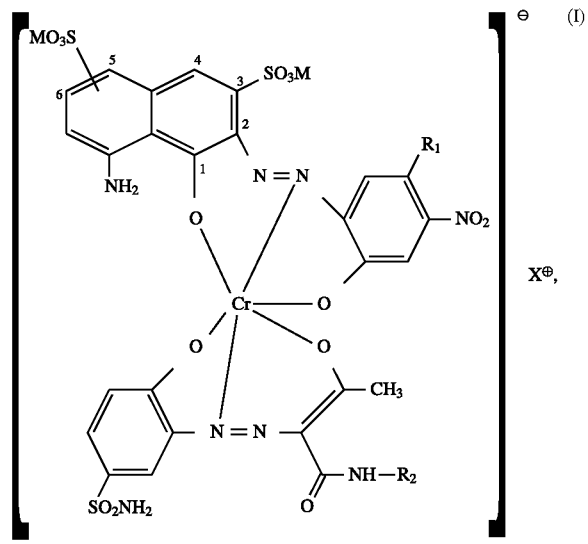

wherein $R_1$ is H or $SO_3M$,

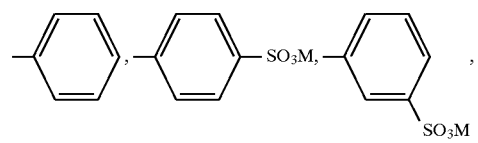

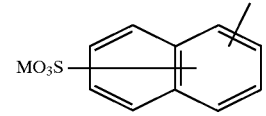

M is hydrogen or a non-chromophoric cation and $X^+$ is hydrogen or a non-chromophoric cation, are useful as dyes for oxidized aluminium substrates.

15 Claims, No Drawings

1:2 CHROMIUM COMPLEXES, THEIR PRODUCTION AND USE

This invention is concerned with chromium 1:2 complexes, their method of manufacture and their use in dyeing anodized aluminium substrates.

Oxidized aluminium or aluminium alloys are favored by architects for facades on exterior structures due to the distinctive aesthetic appearance resulting from their surface structure. Colouration of oxidized aluminium or aluminium alloy poses a continual problem as dyes which are employed in said colouration are subjected to harsh weather conditions and in particular, exposure to direct sunlight often for long periods.

A compound having the below mentioned formula is a known dyestuff which has been utilized as a dye for aluminium. However, this compound has a tendency to fade when used in applications where long exposure to direct sunlight is involved, making it less suitable for colouration of external architectural structures.

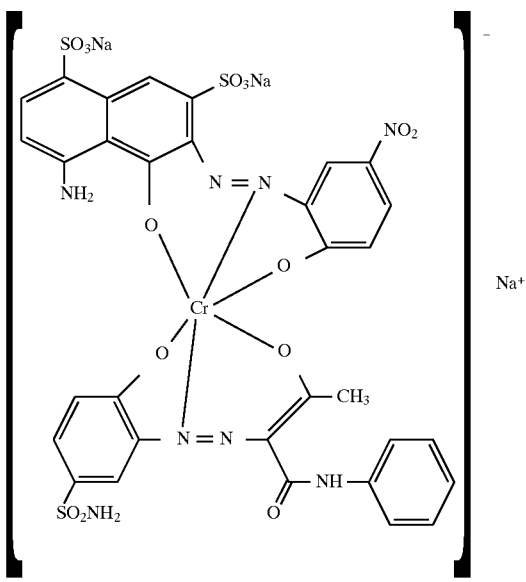

There remains a need to provide suitably light-stable dyestuffs which display a reduced tendency to fade when exposed to direct sunlight for prolonged periods of time.

Surprisingly we have now found that certain 1:2 chromium complexes having structures similar to that described above, but which differ at least in respect of the nitro-group arranged in para-position to the azo-group, display substantially improved light fastness.

According to the invention there is provided a compound according to the formula (I)

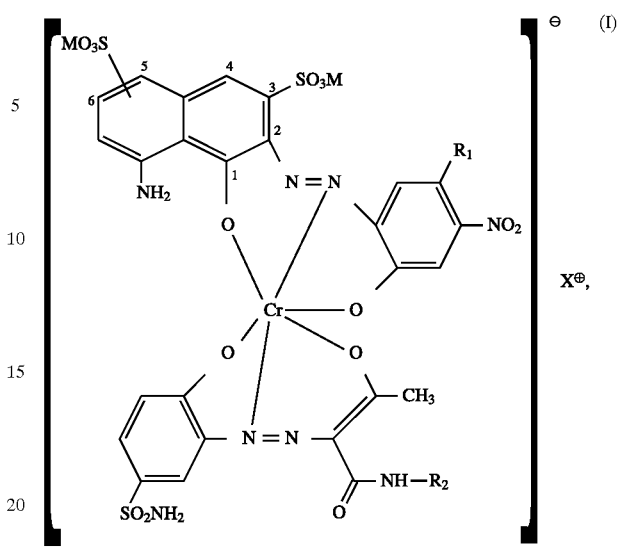

wherein $R_1$ is H or $SO_3M$ $R_2$ is

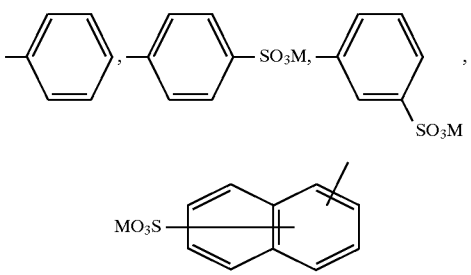

M is hydrogen or a non-chromophoric cation and $X^+$ is hydrogen or a non-chromophoric cation.

The cation may be selected from alkali metal cation, especially $Li^+$, $Na^+$ and $K^+$, the ammonium cation, a mono-, di-, tri- or tetra-($C_{1-4}$ alkyl)-ammonium cation or a mono-, di- or tri-($C_{2-3}$-alkanol)-ammonium cation.

When $R_2$ is a naphthalenic moiety it is preferably

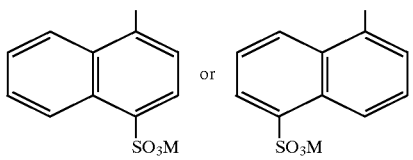

In a preferred aspect of the invention, there is provided a compound according to the formula

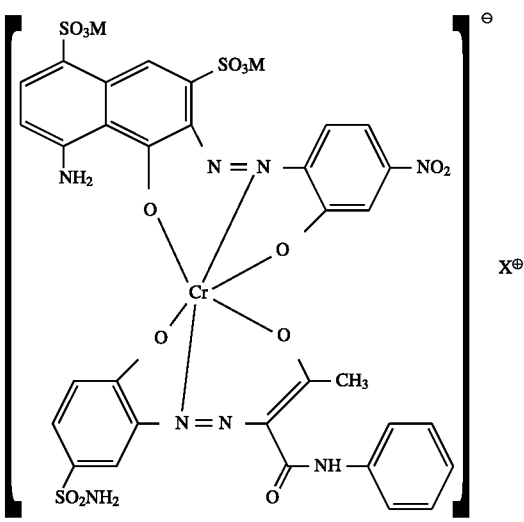

wherein M and X⁺ are as hereinabove described.

The invention further provides a process of forming the compounds of the formula (I) comprising reacting a 1:1 chromium complex of a compound of the formula (II) with a metal-free compound of the formula (III) or reacting a metal-free compound of formula (II) with a 1:1 chromium complex of a compound of the formula (III).

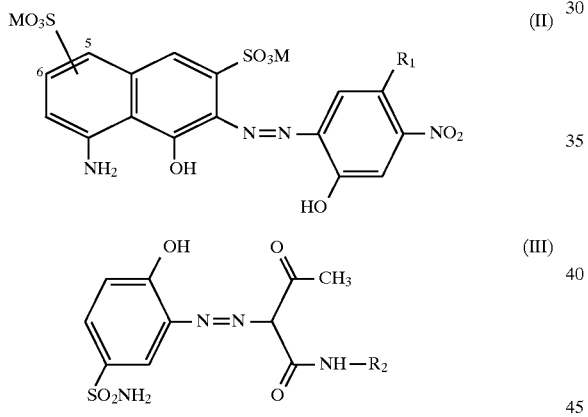

The metallised form of compounds (II) and (II) may be obtained by reacting the corresponding chromium-free compound with a chromium-donating compound, typically chromium-III-hydroxide or a chromium-III-salt, for example chromium-III-sulphate, chromium-III-acetate, chromium-III-chloride, chromium-III-formate and chromium alums.

An alternative synthesis of the compounds of formula (I) involves the reaction of an appropriate mixture of the chromium-free compounds (II) and (III) with a slight excess of the chromium-donating compound referred to above.

The formation of the compounds according to the formula (I) may be carried out in an organic solvent miscible with water, for example, formamide, glycerin or ethylene glycol, in water or in a mixture of said solvents and water. The reaction is preferably carried out at a pH of greater than 4, i.e. slightly acidic, neutral or alkaline conditions and at a temperature of between 60° to 140° C.

Isolation of the compounds of formula (I) may be carried out in conventional manner, preferably by salting out and filtration. Solutions of the compound in organic solvents are diluted with water. From the aqueous solution the compound may be precipitated by cooling, possibly with addition of salts. Subsequently, the precipitated compound may be separated by filtration followed by drying and, if desired, grinding to a powder. A solution of the compound may be purified, in particular desalinated, by membrane filtration. The desalinated solution may be used as such or—if desired—be dried, e.g. spray-dried.

Depending on the reaction and isolation conditions the compounds according to the invention are obtained in free-acid form or preferably in salt form with respect to the cation neutralizing the chromophoric complex anion and also to the cation neutralizing the sulphonic acid groups and any further anionic groups present.

The cation neutralizing the complex anion is not critical and may be any of those non-chromophoric cations common in the field of anionic metal complex dyestuffs. Examples of suitable cations are alkali metal cations and unsubstituted or substituted ammonium ions, such as lithium, sodium, potassium, ammonium, mono-, di-, tri- and tetra-methylammonium, triethylammonium, mono-, di- and tri-ethanolammonium and mono-, di- and tri-isopropanolammonium. The preferred cations are the alkali metal cations and the ammonium cation, with potassium or sodium being the most preferred.

Likewise, any ring substituents capable of existing in salt form are preferably in salt form. Suitable cations are those mentioned as cations for neutralizing the complex anion. Generally, all cations present in a compound of formula (I) may be the same or different; preferably, they are identical, with potassium or sodium being the most preferred cation.

The compounds (II) and (III) may be prepared by known methods. A suitable method of preparing these compounds comprises reacting the diazotised amines (IIa) and (IIIa)

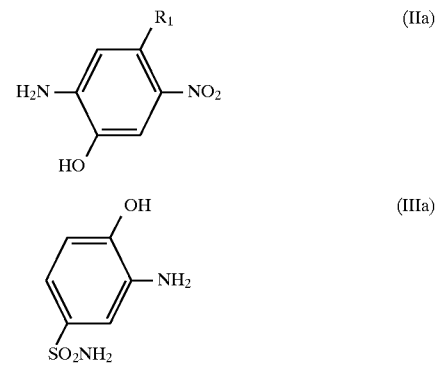

with the corresponding coupling component (IIb) or respectively (IIIb)

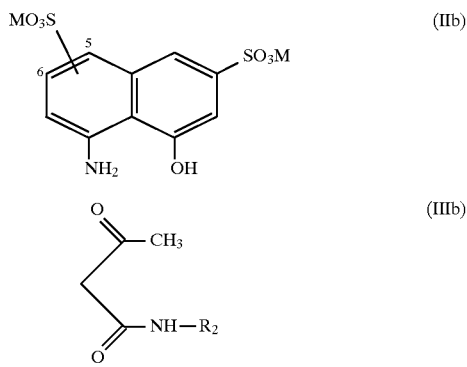

The compounds of formula (I) are readily soluble in water and are suitable for dyeing or printing various materials, such as natural and synthetic polyamides, for example, wool, silk or nylon, polyurethanes and also leather. They are particularly suited for dyeing or printing artificially produced oxide layers on the surface of metallic aluminium or aluminium alloys, i.e. layers produced by chemical or preferably anodizing processes, preferably in aqueous solutions.

The compounds of formula (I) may also be used in the form of storage-stable liquid concentrated dye preparations which may be prepared by dissolving the dyestuff preferably in water optionally with the addition of an organic solvent miscible with water and optionally in the presence of conventional auxiliaries, such as solubilising agents. Examples of organic solvents are mono-, di-, tri-, tetra- and polyethyleneglycols and their mono- and dialkylethers in particular mono- and di-($C_{1-4}$-alkyl)-ethers. These concentrated dye compositions advantageously contain 10–40%, preferably 15–35% by weight of dye of formula (I) preferably in salt form, and 5–50%, preferably 10–40% by weight of water miscible solvent; where the solvent is a glycol or glycol derivative as above, a further auxiliary is not necessary.

The oxide layers on aluminium dyed with the compounds of formula (I) show high resistance to heat and good light fastness.

Furthermore, the compounds of formula (I) give highly stable dyebaths and have a high adsorption rate. During the dyeing process, they are not or only slightly sensitive to aluminium ions.

By oxide layers produced by anodizing processes is meant porous layers of aluminium oxide adhering firmly to the base metal, such as those produced by electrochemical treatment of the aluminium surface in an electrolyte-containing water and a suitable acid in conventional way, in particular using alternate current or/and direct current with the aluminium workpiece forming the anode.

In the field of surface treatments for aluminium, coloured oxide layers produced by anodisation are very important owing to their exceptional resistance to mechanical forces and corrosion. In order to produce coloured oxide layers, conventional processes may be used. Advantageously, dyeing is effected in accordance with the adsorptive dyeing process, a method in which the anodized aluminium is immersed in an aqueous dyestuff solution. Adsorption dyeing subsequent to the electrolytic formation of an oxide layer on aluminium is described e.g. in "Galvanotechnik 77, (1987), Nr. 12, 3549–3553". The treatment may be carried out at a temperature below 100° C., e.g. $\geq$15° C., preferably in the range between ambient temperature (=20° C.) and 80° C., of the bath. Temperatures between 50° and 65° C. are particularly preferred. The pH is chosen so that the oxide layer is either not attacked or only slightly affected. The dyeing is suitably carried out in the pH range of 3 to 8, preferably in the pH range of 4.5 to 6. Adjustment and maintenance of the pH may be achieved by the addition of usual acids and bases typically used in the adsorptive dyeing process, e.g., sulphuric acid, acetic acid, ammoniac and sodium hydroxide solution. If desired, other additives conventionally employed to improve the colouration process, e.g., equalizing additives, buffer systems, anti-smut agents (e.g. those described in DE-A 3327191) and organic solvents miscible with water, may be used.

The dyestuff concentration and time of treatment may be varied over a wide range, depending on the substrate and the desired characteristics, e.g. the required intensity of dye shade and the thickness and structure of the oxide layer. The preferred concentration range is from 0.01 to 10 grams per liter. The preferred duration of treatment is from 1 to 30 minutes, a treatment time of 15 to 20 minutes being particularly preferred.

By reference to aluminium is meant not only pure aluminium, but also those aluminium alloys which behave in a similar fashion as the pure metal with regard to anodic oxidation, such as alloys of the type Al/Mg, Al/Si, Al/Mg/Si, Al/Zn/Mg, Al/Cu/Mg and Al/Zn/Mg/Cu. As electrolytes for the anodizing process there may be employed, e.g., chromic, oxalic and sulphuric acid. The direct-current sulphuric acid process is the most preferred anodizing method.

The compounds of formula (I) are also suitable for the colouration of chemically produced oxide layers on aluminium, the so-called conversion layers as produced, for example, by the effect of acid or alkaline baths containing the salts of chromic acid.

After dyeing, the coloured oxide layer may be processed in conventional manner, in particular by rinsing and sealing. A particularly advantageous method of aftertreatment is the sealing of the oxide layer by treating with boiling water or steam, optionally in the presence of an agent which promotes sealing and which inhibits bleeding off of the dyestuff, such as nickel or cobalt acetate.

The compounds according to the invention dye substrates hereinabove mentioned to green shades with a high intensity and light fastness.

The light fastness may be determined in accordance with a method based on a modification of the ISO Test Standard 2135, in particular as follows:

The apparatus, an ATLAS Weather-Ometer 65 WRC comprising a Xenon arc lamp, is calibrated by exposing a piece of cloth having light fastness No. 6 on the European Blue Scale, to the light source. The time taken for this piece of cloth to exhibit a colour intensity change equivalent to 3 on the Grey Scale (about 25% loss of intensity) is noted. This time period is defined as the exposure cycle for the apparatus.

Each workpiece to be tested is in turn exposed to the light source and the exposure time determined.

The result of the test are expressed in terms of light fastness numbers. Light fastness numbers are related to exposure time and exposure cycles in the following way:

| Exposure cycles | Exposure time/hours | Light fastness No. |
| --- | --- | --- |
| 1 | 200 | 6 |
| 2 | 400 | 7 |
| 4 | 800 | 8 |
| 8 | 1600 | 9 |
| 16 | 3200 | 10 |

There now follows a series of examples which serve to illustrate the invention. In the examples, all parts are expressed by weight and temperatures are in degrees Celsius, unless otherwise stated.

EXAMPLE 1a

Preparation of 1:1 chromium complex 24.2 part (based on 100% active compound) of the azo-dyestuff formed from 2-hydroxy-4-nitroaniline and 1-amino-8hydroxynaphthaline-4,6disulphonic acid is suspended in 300 parts of water. The pH is adjusted to 2.5 with the addition of hydrochloric acid and thereafter chromium-III-sulphate is added at a ratio of 0.05 mols of chromium-III-sulphate for every 0.05 mols of the azo dye. This reaction mixture is reacted at reflux for 15 hours whilst maintaining the pH at 2.5 with sodium hydroxide.

EXAMPLE 1b

Preparation of asymmetric 1:2 chromium complex 18.8 part of 2-(2-hydroxy-5-sulfamoyl-phenylazo)-3-oxo-N-phenyl-butyramide is added to an aqueous solution of the 1:1 chromium complex obtained according to Example 1a, which has been previously adjusted to a pH of 8.5 with addition of appropriate amount of sodium hydroxide, at a ratio of 0.05 mols of 1:1 chromium complex for every 0.05 mols of the azo dye. The reaction mixture is stirred for 3 hours at 90° C. The resultant reaction product is precipitated with sodium chloride, filtered and dried. The product formed corresponding to formula (I) has $\lambda_{max}$ values of 660 nm and 455 nm in 0.1M NaOH.

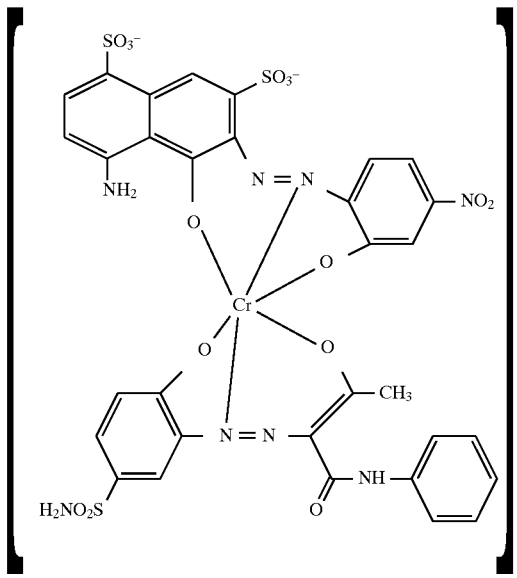

EXAMPLE 1c 50 parts of a humid presscake of the dyestuff prepared according to Example 1b containing approx. 30% by weight of water is diluted with 20 parts water and 25 parts diethyleneglycol and stirred for 1 hour at 50° C. A homogeneous liquid composition of the dyestuff is obtained which even at longer storage at temperatures below 0° C. does not show any precipitation of the dyestuff and when poured into water, provides a clear solution within a short time.

EXAMPLES 2–5

The following compounds of formula (I) are prepared analogously to the process described in Examples 1a and 1b in the form of sodium salts

| Example | $SO_3H$ position | $R_1$ | $R_2$ | $\lambda_{max1}$ 0.1M NaOH | $\lambda_{max2}$ 0.1M NaOH |
|---|---|---|---|---|---|
| 2 | 6 | $SO_3H$ | ⌬ | 652 | 455 |
| 3 | 6 | $SO_3H$ | ⌬-$SO_3H$ | 653 | 455 |
| 4 | 6 | $SO_3H$ | naphthyl-$SO_3H$ | 653 | 453 |
| 5 | 6 | $SO_3H$ | naphthyl-$SO_3H$ | 653 | 453 | they may be formulated to liquid forms analogously to Example 1c.

Application Example A

A degreased and deoxidized workpiece of pure aluminium is anodically oxidized for 50 minutes at a temperature of 18° to 20° C. with a potential of 15° to 17 volts and with a direct current density of 1.5 amperes/dm² in an aqueous solution containing 17 to 22 parts of sulphuric acid and 0.5–1.5 parts of aluminium ions per 100 parts. An oxide layer of approximately 20 µm thickness is obtained.

After rinsing with water, the workpiece is immersed for a period of 20 minutes at 60° in a solution containing 0.5 parts of the 1:2 chromium complex produced in accordance with Examples 1a and 1b in 1000 parts of deionised water the pH of which is adjusted to ca. 5.5–5.7 by means of acetic acid and sodium acetate. The dyed workpiece is rinsed with water and then sealed for 60 minutes at 98° to 100° C. in deionised water.

In order to avoid a possible smutting of the coloured surface during sealing, a conventional anti-smut agent may be added to the deionised water, if desired.

A workpiece having a green colouration is obtained having good resistance to heat and also to fading on exposure to light (workpiece A). The light fastness value of workpiece A, determined in accordance with the above described modification of the ISO Test Standard 2135, is >10.

If the sealing is carried out under otherwise identical conditions in a solution containing 3 parts of nickel acetate in combination with surface active compounds in 1000 parts of water, a colouration of comparable quality is obtained.

Application Example B (comparative example)

An identical process as in Application Example A is employed to form a workpiece coloured with the prior art compound having the formula

9

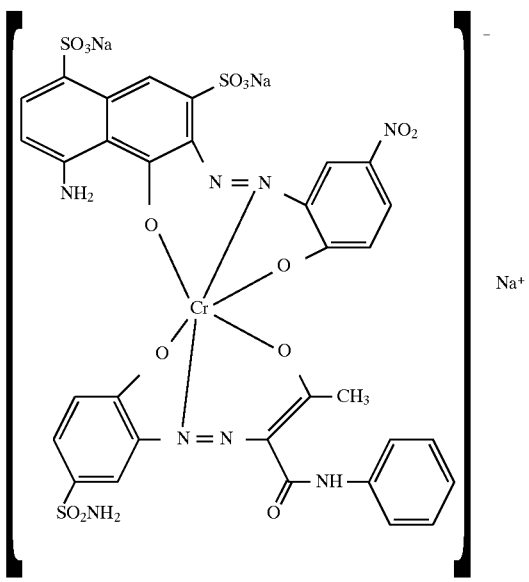

This workpiece is hereinafter referred to as workpiece B.

The light fastness value of workpiece B, determined in accordance with the above described modification of the ISO Test Standard 2135, is 7–8.

Application Examples C to F

The procedure described in Application Example A is repeated, with the difference that instead of the 1:2 chromium complex dye produced according to Examples 1a and 1b, there is employed the same amount of each of the dyes of Examples 2 to 5. There are obtained green dyeings of high fastnesses, especially light fastness. The obtained workpieces are referred to as workpieces C, D, E and F. The light fastness value of each of the workpieces C, D, E and F, determined in accordance with the above described modification of the ISO Test Standard 2135, is higher than the one of workpiece B.

In Application Examples A, B, C, D, E, and F each of the dyes may also be employed in the form of the liquid compositions of Example 1c or the analogous liquid forms of the dyes of Examples 2–5.

10

I claim:

1. A compound according to the formula (I)

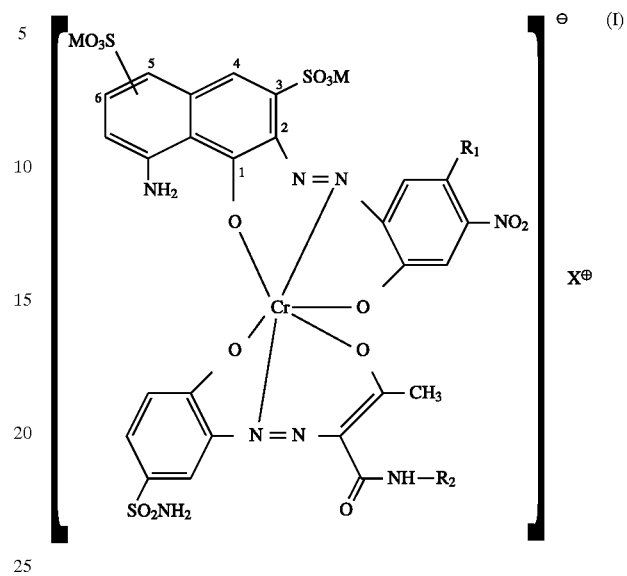

wherein $R_1$ is H or $SO_3M$, $R_2$ is

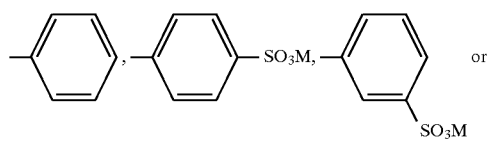

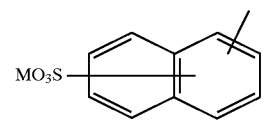

M is hydrogen or a non-chromophoric cation and $X^+$ is hydrogen or a non-chromophoric cation.

2. A compound according to claim 1 wherein $R_2$ is

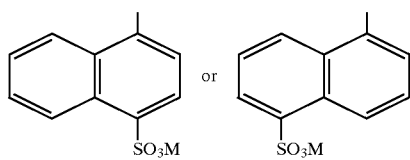

3. A compound according to claim 1 having the formula

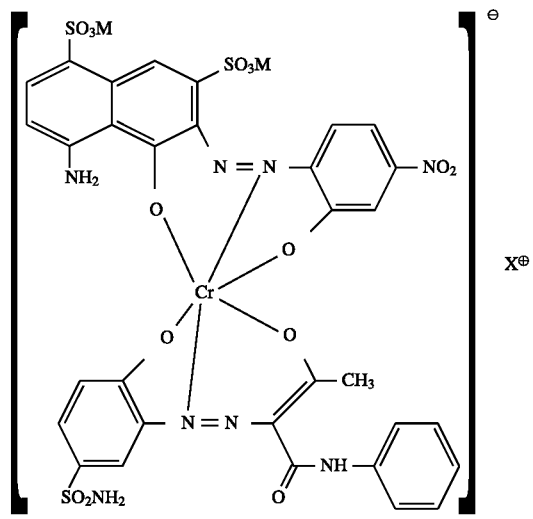

wherein each of M and $X^+$ signify an alkali metal cation or an ammonium cation.

4. A compound of formula (I) according to claim 1, produced by reacting a 1:1 chromium complex of a compound of formula (II)

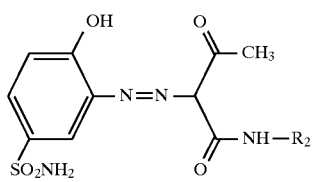

(II)

wherein $R_1$ is H or $SO_3M$, and

M is hydrogen or a non-chromophoric cation with a chromium-free compound of formula (III)

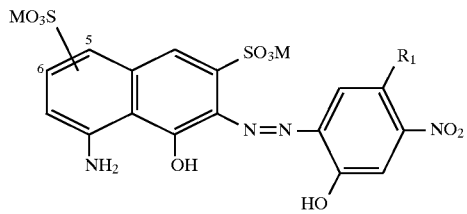

(III)

wherein

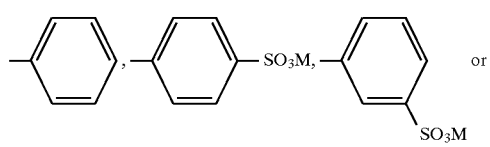

or

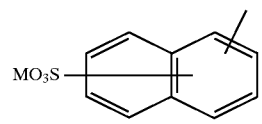

and

M is hydrogen or a non-chromophoric cation.

5. An asymmetric 1:2 chromium complex of a compound of formula (I) according to claim 1, produced by reacting a chromium-free compound of formula (II)

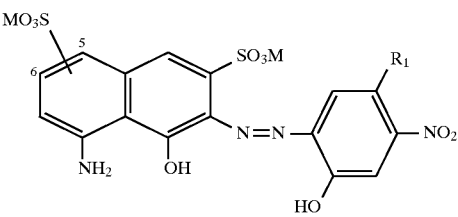

(II)

wherein $R_1$ is H or $SO_3M$, and

M is hydrogen or a non-chromophoric cation with a 1:1 chromium complex of a compound of formula (III)

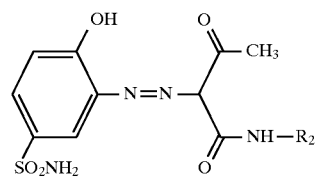

(III)

wherein

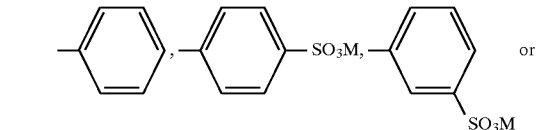

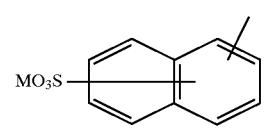

and

M is hydrogen or a non-chromophoric cation.

6. A mixed 1:2 chromium complex of a compound of formula (I) according to claim 1, produced by reacting a mixture of the chromium-free compound of formula (II)

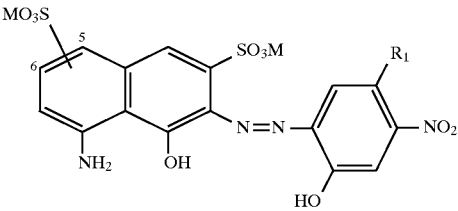

(II)

wherein $R_1$ is H or $SO_3M$, and

M is hydrogen or a non-chromophoric cation and the chromium-free compound of formula (III)

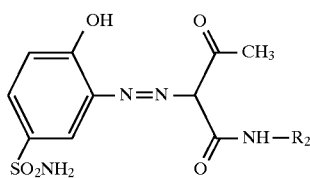

wherein

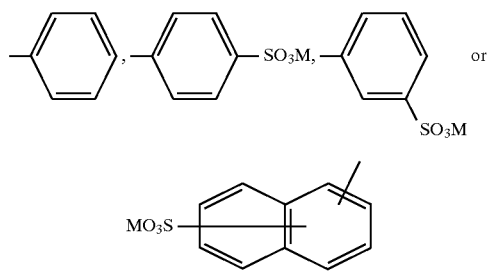

and

M is hydrogen or a non-chromophoric cation with a slight excess of a chromium-donating compound.

7. A concentrated aqueous dye composition comprising the compound of formula (I) according to claim 1.

8. A concentrated aqueous dye composition according to claim 7, comprising 10 to 40% by weight of a compound of formula (I), in the form of an acid or a salt of a non-chromophonic cation, and 5 to 50% by weight of a water miscible solvent.

9. A concentrated aqueous dye composition according to claim 8, wherein the water miscible solvent is a glycol or glycol derivative.

10. A process of dyeing an oxidized layer on aluminum or aluminum alloy comprising immersing a substrate to be dyed in an aqueous solution of a compound of formula (I) according to claim 1.

11. A process of dyeing an oxidized layer on aluminum or aluminum alloy according to claim 10 comprising immersing the substrate to be dyed in a concentrated aqueous dye composition of the compound of formula (I).

12. A dyestuff composition for dyeing an oxidized layer on aluminum or aluminum alloy comprising a compound of formula (I) according to claim 1.

13. A dyestuff composition for dyeing an oxidized layer on aluminum or aluminum alloy according to claim 12 comprising 10 to 40% by weight of a compound of formula (I), in the form of an acid or a salt of a non-chromophonic cation, and 5 to 50% by weight of a water miscible solvent.

14. A dyestuff composition for dyeing an oxidized layer on aluminum or aluminum alloy according to claim 13, wherein the water miscible solvent is a glycol or glycol derivative.

15. An oxidized aluminum or aluminum alloy substrate comprising a compound of formula (I) according to claim 1.

* * * * *

UNITED STATES PATENT AND TRADEMARK OFFICE
CERTIFICATE OF CORRECTION

PATENT NO. : 5,853,431
DATED : December 29, 1998
INVENTOR(S) : Klaus Korte

Page 1 of 2

It is certified that error appears in the above-identified patent and that said Letters Patent is hereby corrected as shown below:

On the title page,
In the Abtract [57]: after "wherein $R_1$ is H or $SO_3M$," and before the structure, insert --$R_2$ is--.

Column 2, line 24, after "$SO_3M$" insert a comma --,--.

Column 6, line 36, delete "result" and substitute therefor --results--.

Column 6, line 56, delete "1-amino-8hydroxynaphthaline-4,6disulphonic" and substitute therefor -- 1-amino-8-hydroxynaphthaline-4,6-disulphonic --.

Column 6, line 66, delete "part" and substitute therefor --parts--.

Column 8, line 30, after "15", delete "° ".

Column 11, line 61, insert before the structure, --$R_2$ is--.

UNITED STATES PATENT AND TRADEMARK OFFICE
CERTIFICATE OF CORRECTION

PATENT NO. : 5,853,431
DATED : December 29, 1998
INVENTOR(S) : Klaus Korte

It is certified that error appears in the above-identified patent and that said Letters Patent is hereby corrected as shown below:

Column 12, line 36, insert before the structure, --$R_2$ is--.

Column 13, line 11, insert before the structure, --$R_2$ is--.

Column 14, line 1, delete "chromophonic" and substitute therefor --chromophoric--.

Column 14, line 21, delete "non-chromophonic" and substitute therefor --non-chromophoric--.

Signed and Sealed this

Eighteenth Day of May, 1999

Attest:

Q. TODD DICKINSON

*Attesting Officer*   *Acting Commissioner of Patents and Trademarks*